UNITED STATES PATENT OFFICE.

DANIEL O'KEEFE, OF ST. LOUIS, MISSOURI.

PROCESS OF MAKING A COMPOSITION OF MATTER FOR THE TREATMENT OF LEATHER, FABRICS, AND THE LIKE.

1,020,926. Specification of Letters Patent. Patented Mar. 19, 1912.

No Drawing. Application filed March 13, 1911. Serial No. 614,008.

*To all whom it may concern:*

Be it known that I, DANIEL O'KEEFE, a citizen of the United States, and resident of St. Louis, Missouri, have invented a certain new and useful Process of Making a Composition of Matter for the Treatment of Leather, Fabrics, and the Like, of which the following is a specification.

My invention relates to a process of making a composition of matter for the treatment of leather, fabrics, and the like, and consists of the following ingredients, mixed in substantially the proportions, as stated:

| | |
|---|---|
| Petroleum oil | 37% |
| Fish oil | 30% |
| Bay oil | 2% |
| Cedar oil | 3% |
| Mirbane oil | 6% |
| Mustard oil | 3% |
| Venice turpentine | 18% |
| Azalea oil | 1% |
| | 100% |

In preparing my composition I take the fish oil and Venice turpentine and agitate and mix the two thoroughly together, which lessens the viscosity of the Venice turpentine to the consistency of the fish oil, thus forming a thin liquid substance. I then let this thin, liquid substance, composed of fish oil and Venice turpentine, set for about two hours, the object of which is to thoroughly mix, without the application of heat, the constituents of the Venice turpentine with the fish oil. Before mixing the other ingredients I take a funnel or any kind of receptacle and fill it with washed, clean and dried coke, and after I have prepared this bed, as it were, of coke, I then take the mirbane oil, cedar oil and bay oil, and mix the same together in a small vessel and then pour this mixture of these three ingredients over the bed of coke in the funnel or receptacle, and immediately after I have poured this mixture of these three ingredients onto the bed of coke, I then take the fish oil and Venice turpentine mixture and pour it over the top of the coke in the vessel or receptacle, and after I have done this I then take the petroleum oil, the mustard oil and the azalea oil and mix them, and pour this mixture over the contents of the funnel or receptacle. After passing the hereinbefore described mixtures through the bed of coke and gathering it in a receptacle, I then pass the entire mixture through it again, and after that through a bed of clean charcoal, which acts as a filter.

By the herein described process I am enabled to produce my composition of matter without the agency of artificial heat or agitation, and I produce a composition which does not stratify and the color of which does not change, and the composition thus produced has no sediment.

In a companion application, filed by me March 13, 1911, Serial No. 614,009, I have claimed the composition of matter which is made by this process, and such composition of matter is not claimed herein.

It will be observed that the ingredients of my composition are animal, vegetable and mineral oils, of different specific gravities, and by the process herein described, I have been able to produce a composition of these oils wherein there is no stratification, and the composition has all the appearances of chemical affinity or union of the constituent elements which compose the composition.

I claim:—

1. The herein described process of preparing a composition of matter for the treatment of leathers, fabrics, and the like, which consists, first, in taking fish oil and Venice turpentine and mixing the same together so as to reduce the consistency of the Venice turpentine to practically that of the fish oil and allowing said mixture to stand for a limited time; second: taking the cedar, bay and mirbane oils and mixing the same together in a separate vessel and passing said mixture through a body of coke; third: taking the mixture of fish oil and Venice turpentine and passing it through the body of coke through which the mixture of cedar, bay and mirbane oils has been passed; fourth: passing through said body of coke a mixture of petroleum, mustard and azalea oils; thus combining the eight mentioned ingredients of the composition and fifth: taking the combined above mixtures and passing them again through said body of coke; and lastly: passing said mixture through a body of charcoal.

2. The herein described process of preparing a composition of matter for the treatment of leathers, fabrics, and the like, which consists, first, in taking fish oil and Venice turpentine and mixing the same together so as to reduce the consistency of the Venice turpentine to practically that of the fish oil and allowing said mixture to stand for a limited time; second, taking the cedar, bay and mirbane oils and mixing the same together in a separate vessel and passing said mixture through a body of coke; third: taking the mixture of fish oil and Venice turpentine and passing it through the body of coke through which the mixture of cedar, bay and mirbane oils has been passed; and fourth: passing through said body of coke a mixture of petroleum, mustard and azalea oils, thus combining the various ingredients of the composition.

3. The herein described process of preparing a composition of matter for the treatment of leathers, hides, pelts, fabrics and the like, which consists first in taking fish oil and Venice turpentine and mixing the same together so as to reduce the consistency of the Venice turpentine to practically that of the fish oil and allowing said mixture to stand for a limited time; second: taking the cedar, mirbane and petroleum oils and mixing them together in a separate vessel and passing said mixture through a body of coke; third: taking the mixture of fish oil and Venice turpentine and passing it through the body of coke through which the mixture of mirbane, cedar and petroleum oils has been previously passed, thus combining the petroleum oil, fish oil, cedar oil, mirbane oil and Venice turpentine; fourth: passing the total mass of the composition back through the body of coke again; and lastely: passing said mixture through a body of charcoal.

In testimony whereof, I have signed my name to this specification, in presence of two subscribing witnesses.

DANIEL O'KEEFE.

Witnesses:
   EDWARD E. LONGAN,
   E. L. WALLACE.